Patented Mar. 18, 1952

2,590,059

UNITED STATES PATENT OFFICE 2,590,059

HIGH MOLECULAR WEIGHT HALOGENATED MATERIALS STABILIZED WITH A MIXTURE OF AN EPOXY COMPOUND AND A CARBOXYLIC ACID SALT

De Loss E. Winkler, Berkeley, Calif., assignor to Shell Development Company, San Francisco, Calif., a corporation of Delaware No Drawing. Application March 26, 1949,
Serial No. 83,776

9 Claims. (Cl. 260—45.75)

This invention relates to a new composition of matter containing a high molecular weight halogenated organic material and a stabilizer therefor which inhibits or prevents the deteriorating effects of heat and light. More particularly, the invention is concerned with a composition containing a polymer of vinyl chloride in admixture with an especially effective stabilizer Halogen-containing organic materials of high molecular weight such as polymers and copolymers of vinyl chloride are usually fabricated into useful articles by use of heat in milling and/or molding operations. However, these fabricating operations employing heat tend to decompose the halogen-containing material so that it becomes discolored as well as stiffens and loses pliability. Moreover, exposure of the halogen-containing material to light, especially sunlight which is rich in ultraviolet radiation, also causes discoloration as well as softening of the halogen - containing material. Various substances have been added to retard or prevent such discoloration and deterioration, but the need for improvement in this respect still remains.

Among various substances used as stabilizers for polymers of vinyl chloride are strontium or cadmium salts of carboxylic acids. Moreover, as described and claimed in copending application, Serial No. 774,660, filed September 17, 1947, now abandoned, halogen-containing organic materials may be stabilized by incorporation therewith of ethers containing a plurality of epoxyalkoxy radicals, e. g., ethers containing a plurality of glycidyl groups. While use of either the metal salt alone or the epoxy compound alone has a stabilizing effect, it has now been discovered quite unexpectedly that incorporation of both an epoxy compound along with a strontium or cadmium carboxylic acid salt produces a synergistic stabilizing effect. In other words, the stabilizing effect produced by use of the two different substances in combination is considerably greater than the sum of the stabilizing effects expected from use of either substances alone.

Accordingly, the principal aspect of the invention is directed to the new composition of matter containing a halogen-containing organic material of molecular weight above 2000 having incorporated or admixed therewith a stabilizer consisting essentially of (1) a glycidyl ether having a 1,2-epoxy equivalency greater than one and (2) a carboxylic acid salt of strontium or cadmium. Such compositions have superior resistance against the deteriorating effects of heat and light than is possible with use of either the glycidyl ether alone or the metal salt alone even though the proportions are the same as the total of the two substances in the composition.

The high molecular weight halogen-containing material which is the principal constituent of the composition may be any substance containing an appreciable proportion of halogen and a molecular weight of at least 2000. No particular upper limit to the molecular weight is necessary to realize the advantages of the invention so long as it is above 2000. The stabilization is obtained with the halogen-containing organic materials having molecular weights of about 50,000, 100,000, 150,000 or higher. While it is preferred to employ the principle of the invention for the purpose of stabilizing chlorine-containing organic materials, substances containing other halogens such as bromine, fluorine or iodine are also suitable. In general, the halogen atom or atoms are linked directly to a carbon atom which in turn is linked to no other atoms than carbon, hydrogen or other halogen atoms which may be the same or different from the first. Among the materials stabilized, are polyvinyl chloride, after-chlorinated polyvinyl chloride, copolymers of vinyl chloride with various polymerizable compounds containing olefinic double bonds such as vinyl acetate, vinyl chloride, acrylonitrile, maleic anhydride, styrene, etc.; halogenated polyolefins such as chlorinated polyethylene, brominated polyisobutylene, etc.; polymers of chloroprene as well as copolymers thereof with other polymerizable unsaturated compounds such as those named above; halogenated products of fats, train oils, waxes, and the high-boiling hydrocarbons and the like. In general, the stabilizing influence is particularly suitable with substances containing at least 10% halogen, particularly those with up to 75% halogen. Excellent results have been obtained upon stabilizing polyvinyl chloride as well as copolymers of vinyl chloride with up to 15% vinyl acetate.

The glycidyl ethers suitable for use in the composition contain at least 6 carbon atoms as well as one or more ethereal oxygen atoms and preferably have a boiling point above 300° C. By the epoxy equivalency reference is made to the number of 1,2-epoxy groups

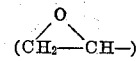

contained in the average molecule of the ether. In the case wherein a substantially pure, simple compound is used, the epoxy equivalency will be an integer of two or more. For example, the epoxy equivalency of such suitable compounds as diglycidyl ether or the diglycidyl ether of ethylene glycol is two while that of the triglycidyl ether of glycerol is three. However, the glycidyl ether may be a mixture of chemical compounds which although they are of similar identity and chemical constitution have different molecular weights. The measured molecular weight of the mixture upon which the epoxy equivalency is dependent will necessarily be an average molecular weight. Consequently, the epoxy equivalency of the glycidyl ether mixture will not necessarily be an integer but nevertheless will be a value which is greather than one. For example, a glycidyl ether suitable for use in the invention is that made by reacting bis-(4-hydroxyphenyl)-2,2-propane with epichlorhydrin in alkaline solution at a mole ratio of about 2.0 moles of epichlorhydrin per mole of the dihydric phenol. The product is a resinous mixture of glycidyl ethers having a measured average molecular weight of 451. Analysis shows the product to contain about 0.318 equivalents of epoxy groups per 100 grams. Consequently, the product has a 1,2-epoxy equivalency of about 1.39, i. e., an average of about 1.39 epoxy groups per molecule.

The glycidyl ethers used to stabilize the composition preferably contain only the elements carbon, hydrogen and oxygen. They include 1,2-epoxy-containing polyethers of polyhydric alcohols such as polyglycidyl ethers thereof like the diglycidyl ether of ethylene glycol, propylene glycol, trimethylene glycol, butylene glycol, glycerol, and the like. Other typical ethers of this class include glycidyl ethers of polyhydric alcohols having a 1,2-epoxy equivalency greater than one such as the polyglycidyl ethers of glycerol, diglycerol, erythritol, pentaglycerol, pentaerythritol, mannitol, sorbitol, polyallyl alcohol, polyvinyl alcohol and the like. The polyglycidyl ethers of the polyhydric alcohols are prepared by reacting the polyhydric alcohol with epichlorhydrin in the presence of 0.1 to 2% of an acid-acting compound as catalyst such as boron trifluoride, hydrofluoric acid or stannic chloride whereby the chlorhydrin ether is formed as product. The reaction is effected at about 50 to 125° C. with the proportions of reaction being such that there is about 1 mole of epichlorhydrin for each molecular equivalent of hydroxyl group in the polyhydric alcohol. Thus, in preparing the ether of diethylene glycol which glycol contains two hydroxyl groups in each molecule thereof, about two moles of epichlorhydrin for each mole of diethylene glycol are used. The resulting chlorhydrin ether from the reaction of a polyhydric alcohol with epichlorhydrin is dehydrochlorinated by heating at about 50° C. to 125° C. with a small, say 10%, stoichiometrical excess of a base. For this purpose sodium aluminate gives good results.

Preparation of several glycidyl ethers of polyhydric alcohols suitable for use as stabilizer in the composition of the invention are illustrated in the following examples.

*Example I*

In a reaction vessel provided with a mechanical stirrer and external cooling means was placed a quantity of 276 parts of glycerol and 828 parts of epichlorhydrin, and to this reaction mixture was added one part of 45% boron trifluoride ether solution diluted with nine parts of ether. The reaction mixture was agitated continuously, the temperature rising to 50° C. during a period of one hour and 44 minutes, at which time external cooling with ice water was applied. The temperature of the reaction mixture was maintained between 49° C. and 77° C. for one hour and 21 minutes.

To 370 parts of the product formed from glycerol and epichlorhydrin was added 900 parts of dioxane and 300 parts of powdered sodium aluminate ($Na_2Al_2O_4$), in a reaction vessel provided with a mechanical agitator and a reflux condenser. The reaction mixture thus formed was continuously agitated and gradually heated to 93° C. during a period of one hour and 51 minutes. The temperature was held at 93° C. for a period of eight hours and 49 minutes. The reaction mixture was then cooled to room temperature (20-25° C.) and this inorganic material, such as sodium chloride and aluminum oxide, was removed by filtration of the cooled mixture. Dioxane and low boiling products were removed by heating the filtrate to 205° C. at 20 mm. pressure, whereupon 261 parts of a pale yellow product was obtained as a residue. This product had a viscosity of D-E (Gardner-Holdt scale) and, therefore, a softening point (Durran's Mercury Method) substantially below 20° C. The product had an equivalent weight to epoxide of 149.

*Example II*

In a reaction vessel fitted with a thermometer, reflux condenser, gas inlet tube and electrically-driven stirrer, were placed 272 grams of powdered pentaerythritol, 124 grams (2 moles) of ethylene glycol and 6 cc. of a $BF_3$-ethyl ether solution (45% $BF_3$). The reaction mixture thus formed was heated to about 135° C., whereupon ethylene oxide was introduced therein through the gas inlet tube. The mixture was then heated at 130-138° C. for 1 hour and 18 minutes. Ethylene oxide addition was discontinued and 136 grams of pentaerythritol (total used, 402 grams; 3 moles) were added to the reaction mixture. Following addition of pentaerythritol, the mixture was heated at 125-130° C. for 50 minutes. Ethylene oxide was then introduced through the gas inlet tube, for 3 hours at 125-170° C. The total quantity of ethylene oxide so introduced was 202 grams (4.6 moles).

The resulting reaction mixture was transferred to a reaction vessel, fitted with thermometer, reflux condenser and electrically-driven stirrer and heated to 120° C. Six cc. of the $BF_3$-ethyl ether solution were added. Epichlorhydrin (1570 grams; 17 moles) was then added during a period of 2 hours and 25 minutes, during which period the temperature varied from 97° C. to 118° C.

A quantity, 231 grams, of the epichlorhydrin reaction product so obtained was placed in a reaction vessel equipped with a thermometer, reflux condenser and electrically-driven stirrer. Three hundred cc. of dioxane, 20 cc. of water and 170 grams of sodium aluminate ($Na_2Al_2O_4$) were added. The reaction mixture thus formed was continuously agitated and heated at about 96° C. for 3 hours. The reaction mixture was treated as described in Example I above, except that the vacuum distillation was continued to 200° C. at 3 mm. pressure. The product, 159 grams, was a clear, very pale yellow liquid, having a viscosity of H (Gardner-Holdt scale). The product also had an epoxide equivalent to 161 and an average molecular weight of 360 (determined by standard freezing point method with benzophenone); this corresponds to an average of about 2.2 epoxide groups per molecule.

The 1,2-epoxide value of the glycidyl ethers described herein is determined by heating a one gram sample of the ether with an excess of the pyridinium chloride dissolved in pyridine (made by adding pyridine to 16 cc. of concentrated hydrochloric acid to a total volume of 1 liter) at the boiling point for 20 minutes whereby the pyridinium chloride hydrochlorinates the epoxy groups to chlorhydrin groups. The excess pyridinium chloride is then back titrated with 0.1 N sodium hydroxide to the phenolphthalein end point. The epoxide value is calculated by considering the HCl as equivalent to the epoxide group. This method is used for obtaining all the epoxide values discussed herein.

A preferred group of glycidyl ethers for use as stabilizer in the composition of the invention is the ether prepared by reacting a dihydric phenol with epichlorhydrin in alkaline solution. Any of the various dihydric phenols are used in preparing these glycidyl ethers including mononuclear phenols like resorcinol, catechol, hydroquinone, etc., or polynuclear phenols like bis - (4 - hydroxyphenyl) - 2,2 - propane (bisphenol), 4,4'-dihydroxy, benzophenone, bis-(4-hydroxyphenyl) - 1,1 - ethane, bis-(4-hydroxyphenyl) - 1,1 - isobutane, bis-(4-hydroxyphenyl) - 2,2-butane, bis-(4 - hydroxy - 2-methylphenyl) - 2,2 - propane, bis-(4-hydroxy-2-tertiary butyl phenyl)-2,2 - propane, bis-(2-dihydroxy-naphthyl)-methane, 1,5-dihydroxy naphthalene, etc.

The glycidyl ethers of the dihydric phenols are made by heating at 50° C. to 150° C. the dihydric phenol with epichlorhydrin, using one to two or more moles of epichlorhydrin per mole of the dihydric phenol. Also present is a base such as sodium, potassium, calcium or barium hydroxide in amount of 10 to 30% stoichiometric excess of the epichlorhydrin—i. e., 1.1 to 1.3 equivalents of base per mole of epichlorhydrin. The heating is continued for several hours to convert the reaction mixture to a taffy-like consistency whereupon the reaction product is washed with water until free of base. Although the product is a complex mixture of glycidyl ethers, the principal product may be represented by the formula

—CH—CH₂(O—R—O—CH₂—CHOH—CH₂)ₙO—R—O—CH₂—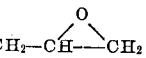

wherein R represents the divalent hydrocarbon radical of the dihydric phenol and n is 0, 1, 2, 3, etc. The length of the chain can be made to vary by changing the molecular proportion of epichlorhydrin and dihydric phenol. Thus by decreasing the moles of epichlorhydrin per mole of dihydric alcohol from about two downwards toward one, the molecular weight and the softening point of the resinous glycidyl ether is increased. In general, these glycidyl ethers, having an epoxy equivalency between one and two, contain terminal 1,2-epoxy groups, and have alternate aliphatic and aromatic groups linked together by ethereal oxygen atoms.

The preparation of glycidyl ethers of polyhydric phenols suitable for use in the invention are illustrated by the examples below.

*Example III*

In a reaction vessel equipped with a stirrer and a reflux condenser, one mole of resorcinol was dissolved in four moles of epichlorohydrin and the temperature of the solution raised to about 85° C. Sodium hydroxide (2 moles) was then introduced in the form of a 30% solution added dropwise over a period of 10 hours. The rate of adding the basic catalyst was such that the reaction solution remained acid to phenolphthalein throughout the addition.

The cooled reaction mixture was freed of precipitated sodium chloride, and the organic portion fractionally distilled. A yield of 0.7 moles (70%) of resorcinyl bisglycidyl ether was obtained in the form of a colorless, bright and viscous liquid, which after being left undisturbed for some time at room temperature slowly crystallized. The ether was readily soluble in various organic solvents, but practically insoluble in water, and had a melting point of from 33–36° C. and a boiling range of from 142–152° C. at 0.04 mm.

*Example IV*

A solution consisting of 11.7 pounds H₂O, 1.22 pounds NaOH and 13.38 pounds of bisphenol was prepared by heating to 70° C., and then cooling to 46° C. at which temperature 14.06 pounds of epichlorhydrin were added. The addition of cold caustic solution (5.62 pounds NaOH in 11.7 pounds H₂O) was started 25 minutes later; the solution was added over a period of 15 minutes, during which time the temperature rose to 63° C. The maximum temperature reached was 71° C. Washing was started 30 minutes after addition of the NaOH solution, and was continued for 4½ hours, the temperature of the wash water being increased from 20° C. at the beginning to 30° C. at the end. It was dried (with steam heating) to a final temperature of 140° C. in 80 minutes, and cooled rapidly. This product had a Durran's Mercury melting point of 27° C. and an epoxide equivalent weight of 249.

*Example V*

A glycidyl ether of bisphenol, i. e., bis-(4-hydroxy-phenyl)-2,2-propane, was prepared by reacting two moles of epichlorhydrin with one mole of bisphenol using an amount of caustic somewhat in excess of two moles. About 798 parts by weight of bisphenol were dissolved in a caustic soda solution made by dissolving 200 parts of caustic soda in 1730 parts of water in a stainless steel closed kettle. Epichlorhydrin in amount of 650 parts was added in one portion to the closed kettle. The kettle was provided with a stirrer and the mixture was stirred during the process. The temperature rose from about 37° C. to about 70° C. in 45 minutes. Caustic soda, 80 parts in 200 parts of water, was then added, whereupon the temperature rose to about 82° C. during the course of a further 30 minutes. Additional caustic soda, 29 parts in 100 parts of water, was then added and the kettle was heated. The temperature of the reaction mixture was gradually increased to about 95° C. in approximately 30 minutes. The aqueous liquor was next drawn off from the taffy-like product which had formed. The latter was washed with hot water while agitated and a series of washing treatments were applied until the water was neutral to litmus. The product was then dried by heating to a final temperature of 130° C. and removed from the kettle. The softening point of the resulting glycidyl ether by Durran's Mercury Method was 43° C. The epoxide equivalent weight was 325.

The other component of the stabilizer is a cadmium or strontium salt of a carboxylic acid. While it is preferred to employ a salt of a monocarboxylic acid of 12 to 20 carbon atoms containing no more than one olefinic double bond therein, salts of other acids may be used if desired such as a salt of acetic, hexanoic, octanoic, lauric, palmitic, or stearic acid; a salt of crotonic or oleic acid; a salt of linoleic or linolenic acid; a salt of benzoic or toluic acid; a salt of a polycarboxylic acid like phthalic, adipic, or maleic acid, a salt of a substituted acid such as chlorostearic, bromopalmitic, salicylic, anthranilic or tryptophan acid; and the like. The salt may thus be of any carboxylic acid substituted or unsubstituted, monobasic or polybasic, since it is the metal part of the salt which is effective in producing the desired stabilizing effect. Nevertheless, certain classes of salts are more preferred than others, namely, those of saturated monocarboxylic acids of 12 to 20 carbon atoms. For this purpose, strontium or cadmium salts of saturated fatty acids are well suited, as well as salts of naphthenic acids, particularly those having an acid number of about 180 to 280, especially 200 to 220.

The valuable synergistic stabilizing effect obtained with the combination of substances employed in the compositions of the invention will be evident upon consideration of the data given in Table I below.

Table I gives the extinction coefficients obtained with compositions containing polyvinyl chloride having a molecular weight of about 100,000 and various stabilizers and combinations thereof before and after heat treatment. Of the stabilizers, "Epoxy IV" designates the glycidyl ether prepared as described in Example IV above; "Cd Naph." represents cadmium naphthenate, "Sr Stearate" represents strontium stearate and "Sr Naph." represents strontium naphthenate. Compositions were prepared by using in parts by weight 100 of polyvinyl chloride: 50 of dioctyl phthalate, i. e., bis-(2-ethylhexyl) phthalate, and 2 of stabilizer indicated in the table. The compositions were prepared by mixing the resin plasticizer and stabilizer and milling the mixture for 15 minutes on a roll mill with roll temperatures of 132 and 150° C. The sheet from the mill was then molded for 2 minutes at 160° C. All the compositions reported herein were prepared in this manner.

In order to determine the deteriorating effects of heat, samples of the composition noted in Table I were exposed for the indicated time at 160° C. in a constant temperature oven wherein air circulated.

In order to determine the extent of discoloration, the extinction coefficient of the compositions was measured with the aid of a spectrophotometer, model 11, manufactured by the Coleman Electric Company, Inc., Maywood, Illinois. This instrument has means for generating monochromatic light which is transmitted by means of a narrow slit through the sample whose discoloration is being measured. The light transmitted through the sample falls on a photo tube and the current produced therein is measured with the aid of a potentiometer, which current is a measure of discoloration of the sample as compared to air which is colorless. By means of this instrument, numerical values of discoloration are obtained which are known as extinction coefficients. The extinction coefficient of air is zero and increased discoloration of a sample is indicated by increasingly larger extinction coefficients. The values represented in Table I were obtained using substantially monochromatic light of predominantly 5000 Å wavelength as were other extinction coefficients reported herein.

Table I

| | Parts by Weight of Stabilizer per 100 Parts of Polymer | | | | | | |
|---|---|---|---|---|---|---|---|
| Epoxy IV | 2 | 0 | 1 | 0 | 1 | 0 | 1 |
| Cd Naph | 0 | 2 | 1 | 0 | 0 | 0 | 0 |
| Sr Stearate | 0 | 0 | 0 | 2 | 1 | 0 | 0 |
| Sr Naph | 0 | 0 | 0 | 0 | 0 | 2 | 1 |
| Extinction Coefficient after heating at 160° C. for: | | | | | | | |
| 0 Hours | 0.8 | 0.7 | 0.4 | 1.3 | 0.8 | 0.6 | 0.5 |
| 0.5 Hours | 1.9 | 1.0 | 0.5 | 1.7 | 1.0 | 1.3 | 0.6 |
| 1.0 Hours | 2.5 | TD | 0.5 | 5.6 | 1.4 | 6.8 | 1.1 |
| 1.5 Hours | 2.9 | TD | 0.5 | 9.4 | 1.5 | TD | 1.6 |
| 2.0 Hours | 3.5 | TD | 0.6 | TD | 1.9 | TD | 2.0 |
| 3.0 Hours | 5.6 | TD | 0.8 | TD | 3.0 | TD | 3.9 |

TD = Sample too discolored to determine extinction coefficient.

The markedly superior and synergistic results obtained with use of the combination of substances as stabilizer is evident from the above results with compositions subjected to the heat treatment which was severe for such plastic. Thus, after one-half hour at 160° C. the composition containing the added 2% of the glycidyl ether had an extinction coefficient of 1.9. Material containing the added 2% of cadmium naphthenate had an extinction coefficient of 1.0. On the other hand, the composition containing an added 1% each of these substances had an extinction coefficient of only 0.5 which was less than than with use of either alone. In other words, the extent of discoloration caused by the heat was less in the composition containing the combination of substances than in the compositions containing comparable amounts of either substance alone.

The synergistic effect is not unique to a particular halogen-containing material such as polyvinyl chloride illustrated above. It applies to the other halogen-containing organic material having a molecular weight above 2000 wherein the halogen atoms are each linked directly to carbon atoms which in turn are linked directly to no other atoms than carbon, hydrogen and oxygen. For example, the synergistic effect is likewise realized upon using the combination of substances to stabilize the copolymer containing about 95% vinyl chloride and 5% vinyl acetate having a molecular weight of about 90,000 as illustrated from the results given in Table II below. In this table, the compositions were subjected to the same heat treatment as those for Table I.

Table II

| | Parts by weight of Stabilizer per 100 Parts of Copolymer | | | | |
|---|---|---|---|---|---|
| Epoxy IV | 2 | 0 | 1 | 0 | 1 |
| Sr Stearate | 0 | 2 | 1 | 0 | 0 |
| Sr Naph | 0 | 0 | 0 | 2 | 1 |
| Extinction Coefficient after heating at 160° C. for: | | | | | |
| 2.0 hours | 2.1 | TD | 1.9 | TD | 1.6 |
| 3.0 | 4.8 | TD | 3.0 | TD | 2.6 |

In order to test the stabilizing effect of the combination of substances for compositions subjected to the deteriorating effects of light, compositions containing the ingredients noted in Table III were prepared and subjected to light from a carbon arc which is rich in ultraviolet radiation for the noted times. The improved stability by use of the combination is apparent from the results given in the following table.

Table III

| | Parts by weight With 50 Parts of Diocytl Phthalate | | | | | | | | | |
|---|---|---|---|---|---|---|---|---|---|---|
| Polyvinyl chloride | 100 | 100 | 100 | 100 | 100 | 100 | 0 | 0 | 0 | 0 |
| Copolymer of 95% vinyl chloride and 5% vinyl acetate | 0 | 0 | 0 | 0 | 0 | 0 | 100 | 100 | 100 | 100 |
| Epoxy IV | 0 | 2 | 0 | 1 | 0 | 1 | 0 | 2 | 0 | 1 |
| Cd Naph | 0 | 0 | 2 | 1 | 0 | 0 | 0 | 0 | 0 | 0 |
| Sr Stearate | 0 | 0 | 0 | 0 | 2 | 1 | 0 | 0 | 2 | 1 |
| Extinction Coef. after subjecting to light radiation for: | | | | | | | | | | |
| 170 hrs | 0.7P | 0.4 | 1.0 | 0.4 | 0.7 | 0.6 | 1.2P | 9.3 | 1.6P | 0.6 |
| 340 hrs | 1.2P | 0.4 | 0.7 | 0.4 | 0.8P | 0.3 | | | | |

P = Surface was pitted.

In the manufacture of many articles from polymers, compositions containing the same are subjected to elevated temperatures in a mold in the absence of contact with heated air. The stabilizing effect was tested under such conditions by placing compositions containing the ingredients noted in Table IV in a mold at 170° C. for 20 minutes and determining the extinction coefficients before and after such treatments. The greater than additive effect for the combination is again evident from the results given in Table IV below.

Table IV

| Parts by Weight With 50 Parts of Dioctyl Phthalate | | | | | | Extinction Coef. after 20 min. in mold at 170° C. |
|---|---|---|---|---|---|---|
| Polyvinyl chloride | Copolymer of 95% vinyl chloride and 5% vinyl acetate | Epoxy IV | Cd Naph. | Sr Stearate | Sr Naph | |
| 100 | 0 | 0 | 0 | 0 | 0 | 7.7 |
| 100 | 0 | 2 | 0 | 0 | 0 | 3.9 |
| 100 | 0 | 0 | 2 | 0 | 0 | 0.5 |
| 100 | 0 | 1 | 1 | 0 | 0 | 0.4 |
| 100 | 0 | 0 | 0 | 2 | 0 | 2.3 |
| 100 | 0 | 1 | 0 | 1 | 0 | 0.9 |
| 100 | 0 | 0 | 0 | 0 | 2 | 1.5 |
| 100 | 0 | 1 | 0 | 0 | 1 | 0.7 |
| 0 | 100 | 0 | 0 | 0 | 0 | 5.1 |
| 0 | 100 | 2 | 0 | 0 | 0 | 2.5 |
| 0 | 100 | 0 | 2 | 0 | 0 | 8.9 |
| 0 | 100 | 1 | 1 | 0 | 0 | 2.4 |
| 0 | 100 | 0 | 0 | 2 | 0 | 4.6 |
| 0 | 100 | 1 | 0 | 1 | 0 | 2.4 |
| 0 | 100 | 0 | 0 | 0 | 2 | 3.7 |
| 0 | 100 | 1 | 0 | 0 | 1 | 1.7 |

Table V

| | Parts by Weight of Stabilizer per 100 parts Copolymer | | | | | |
|---|---|---|---|---|---|---|
| Epoxy IV | 0 | 2 | 0 | 1 | 0 | 1 |
| Cd Naph | 0 | 0 | 2 | 1 | 0 | 0 |
| Sr Stearate | 0 | 0 | 0 | 0 | 2 | 1 |
| Stiffness at start (p. s. i.) | 1,640 | 1,365 | 1,430 | 1,220 | 1,450 | 1,340 |
| Percentage change upon heating at 160° C. for: | | | | | | |
| 0.5 hours | −1 | 18 | 30 | 5 | 8 | −8 |
| 1.0 | 36 | 31 | 48 | 18 | 45 | 17 |
| 1.5 | 138 | 50 | 145 | 49 | 120 | 35 |
| 2.0 | 315 | 209 | 495 | 88 | 266 | 74 |

Since heat not only tends to discolor hydrogen-containing organic materials of high molecular weight, but also adversely affects mechanical properties of compositions containing them, it was of interest to determine the extent of this type of stabilization gained in the compositions of the invention for comparison with prior compositions. The copolymer of 95% vinyl chloride and 5% vinyl acetate plasticized with an added 50% of dioctyl phthalate and containing the stabilizer substances noted in Table V were prepared as described before. Sheets thereof were heat-treated in the air oven at 160° C. for the indicated times and the stiffness in flexure was determined by ASTM designation D 747-43T. Since the initial stiffness varies somewhat with the particular composition, the table records the percentage change which resulted from the heat treatment. Therefrom it will be noted that the use of the combination of stabilizing substances gave much superior results to use of any single one alone.

The proportion of stabilizing substances employed with the high molecular weight halogen-containing organic materials may be varied in order to meet the stabilizing requirements needed for the composition. In general, the amount of total stabilizer (glycidyl ether plus strontium or cadmium salt) is about 0.1% to 10% of the halogen-containing substance. In special cases it may be desirable to use smaller or larger proportions. Good results are obtained with 1% to 5% total stabilizer, and for ordinary purposes use of about 1% each of the glycidyl ether and metal salt is preferred.

While it is most desirable to employ equal quantities by weight of the glycidyl ether and the metal salt, there may be used such other proportions as desired. In general, the two substances are employed in a weight ratio of 1:9 to 9:1 of the ether to the salt, although it is more preferable to use a more restricted range of about 4:6 to 6:4.

Use of larger proportions of the mixture of stabilizing substances produces greater stabilizing effect. In view of the synergism achieved with use of the combination of glycidyl ether and the metal salt, lesser proportions of the combination are needed to produce a greater extent of the stabilization than with use of ether alone. This fact is illustrated by the results of Table VI below which reports extinction coefficients obtained in compositions after being subjected to the heat treatment in the air oven at 160° C. for the noted times. The compositions consist of polyvinyl chloride having incorporated therewith 50 parts by weight of dioctyl phthalate as plasticizer and the indicated parts of stabilizer per 100 parts of polymer. The glycidyl ether designated as "Epoxy V" was that prepared as described in Example V.

*Table VI*

| | Parts by Weight of Stabilizer per 100 Parts Polymer | | | | | | |
|---|---|---|---|---|---|---|---|
| Epoxy V | 0 | 5 | 0.5 | 1 | 1.5 | 2 | 2.5 |
| Sr Naph | 5 | 0 | 0.5 | 1 | 1.5 | 2 | 2.5 |
| Extinction Coefficient after heating at 160° C. for: | | | | | | | |
| 0 hrs | 1.7 | 0.8 | 0.4 | 0.4 | 0.5 | 0.6 | 0.7 |
| 0.5 | 1.5 | 2.0 | 0.8 | 0.6 | 0.6 | 0.6 | 0.7 |
| 1.0 | 2.1 | 3.1 | 1.6 | 1.2 | 0.8 | 0.8 | 1.0 |
| 1.5 | 3.1 | 3.8 | 3.5 | 2.0 | 1.3 | 1.1 | 1.8 |
| 2.0 | 4.6 | 4.4 | 8.6 | 3.6 | 1.9 | 1.8 | 2.2 |
| 3.0 | 8.7 | 6.7 | TD | 8.6 | 4.1 | 3.9 | 3.8 |

It will be noted from the foregoing results that an added 5% of strontium naphthenate alone gives a composition having an extinction coefficient of 8.7 after heating in air at 160° C. for 3 hours which is substantially the same extent of discoloration which occurs with the composition containing only an added 1% each of the glycidyl ether along with the strontium naphthenate. Likewise, the use of an added 5% of the glycidyl ether alone gives a composition having an extinction coefficient of 6.7 after heating for the same time and temperature which is about the same extent of discoloration occurring with the composition containing about an added 1.2% each of the substances. In other words, polyvinyl chloride containing an added 1.2% of the glycidyl ether and an added 1.2% of the strontium naphthenate is stabilized as well or better than polyvinyl chloride having incorporated therewith an added 5% of either of these substances alone.

The compositions of the invention may contain in addition to the halogenated organic material of high molecular weight and the combination of stabilizing substances, any other material desired such as plasticizers like dioctyl phthalate, tricresyl phosphate, chlorinated diphenyl and dibutyl sebacate, colorants, dyes, pigments and/or fillers. While in general it may be most convenient to incorporate the various materials together on a heated roll mill, other conventional and well-known methods may be used such as by solution wherein all the substances are dissolved or mixed in a solvent and then the solution is subjected to evaporation of the solvent therefrom.

While the use of the strontium or cadmium salt in conjunction with the glycidyl ether has been shown to give a synergistic effect, there may be used in combination with the glycidyl ether any alkaline earth metal salt of a carboxylic acid, numerous examples of which have been enumerated hereinbefore.

I claim as my invention:

1. A composition of matter containing a halogen-containing organic substance having a molecular weight above 2000 and containing 10% to 75% of halogen in admixture with 0.1 to 10% of stabilizer therefor consisting essentially of each of a glycidyl ether having a 1,2-epoxy equivalency greater than one, and a carboxylic acid salt of a metal from the group consisting of cadmium and the alkaline earth metals, the weight ratio of said ether to said salt being from 1:9 to 9:1.

2. A stabilized composition of matter containing an organic substance having a molecular weight above 2000 and containing 10% to 75% of halogen in admixture with 0.1% to 10% of heat and light stabilizer therefor consisting essentially of a glycidyl ether having a 1,2-epoxy equivalency greater than one, and a carboxylic acid salt of cadmium in a weight ratio of 1:9 to 9:1 of said ether to said salt.

3. A stabilized composition of matter containing a polymer of vinyl chloride with molecular weight above 2000 and containing at least 10% chlorine in admixture with 1% to 5% of heat and light stabilizer consisting essentially of a glycidyl ether of a dihydric phenol having a 1,2-epoxy equivalency greater than one, but not exceeding two, and a strontium salt of a carboxylic acid containing no more than one unsaturated carbon-to-carbon bonding therein, the weight ratio of said ether to said salt being from 1:9 to 9:1.

4. A stabilized composition of matter containing a polymer of vinyl chloride with molecular weight above 2000 and containing at least 10% chlorine in admixture with 1% to 5% of material as sole heat and light stabilizer therefor consisting essentially of a glycidyl ether having a 1,2-epoxy equivalency greater than one, and a cadmium salt of a saturated monocarboxylic acid, the weight ratio of said ether to said salt being from 1:9 to 9:1.

5. A stabilized composition of matter containing polyvinyl chloride with molecular weight above 2000 in admixture with about 2% of heat and light stabilizer therefor consisting essentially of about equal parts by weight of glycidyl ether of polyallyl alcohol having a 1,2-epoxy equivalency greater than one, and cadmium naphthenate.

6. A stabilized composition of matter containing a polymer of vinyl chloride with up to 15% vinyl acetate in admixture with 1% to 5% of heat and light stabilizer therefor consisting essentially of a glycidyl ether of bis-(4-hydroxyphenyl)-2,2-propane having a 1,2-epoxy equivalency greater than one, but not greater than two, and a strontium salt of a saturated monocarboxylic acid of 12 to 20 carbon atoms, the weight ratio of said ether to said salt being from 1:9 to 9:1.

7. A stabilized composition of matter containing polyvinyl chloride with molecular weight above 2000 in admixture with about 2% of heat and light stabilizer therefor consisting essentially of about equal parts by weight of a glycidyl ether of bis-(4-hydroxyphenyl)-2,2-propane having a 1,2-epoxy equivalency of 1.3 to 2, and strontium naphthenate.

8. A stabilized composition of matter containing polyvinyl chloride with molecular weight above 2000 in admixture with about 2% of heat and light stabilizer therefor consisting essentially of about equal parts by weight of a glycidyl ether of bis-(4-hydroxyphenyl)-2,2-propane having a 1,2-epoxy equivalency of 1.3 to 2, and a strontium salt of a fatty acid of 12 to 20 carbon atoms.

9. A stabilized composition of matter containing polyvinyl chloride with molecular weight above 2000 in admixture with about 2% of heat and light stabilizer therefor consisting essentially of about equal parts by weight of a glycidyl ether of bis-(4-hydroxyphenyl)-2,2-propane having a 1,2-epoxy equivalency of 1.3 to 2, and strontium stearate.

DE LOSS E. WINKLER.

REFERENCES CITED

The following references are of record in the file of this patent:

UNITED STATES PATENTS

| Number | Name | Date |
|---|---|---|
| 2,456,216 | Richter | Dec. 14, 1948 |
| 2,462,422 | Plambeck | Feb. 22, 1949 |